United States Patent
Chang et al.

[11] Patent Number: 5,996,243
[45] Date of Patent: Dec. 7, 1999

[54] HAIR DRYER

[76] Inventors: Chih-Chang Chang; Hercules Lee; Benjamin Chen, all of 10F-3, No. 96, Sec. 2, Chung-Shan N. Rd., Taipei, Taiwan

[21] Appl. No.: 09/156,710

[22] Filed: Sep. 18, 1998

[51] Int. Cl.[6] .................................................. A45D 2/00
[52] U.S. Cl. ...................... 34/97; 34/90; 34/96; 126/401
[58] Field of Search .................................. 34/96, 97, 98, 34/99, 90; 126/414, 401, 403; 431/75; 392/380, 381, 382, 383, 384, 385

[56] References Cited

U.S. PATENT DOCUMENTS

| | | | |
|---|---|---|---|
| 4,555,232 | 11/1985 | Raccah et al. | 432/222 |
| 4,869,944 | 9/1989 | Harada et al. | 428/116 |
| 4,903,416 | 2/1990 | Levin et al. | 34/97 |
| 4,911,143 | 3/1990 | Pivot et al. | 126/414 |
| 5,511,972 | 4/1996 | Dalla Betta et al. | 431/170 |

*Primary Examiner*—Henry Bennett
*Assistant Examiner*—Pamela A. Wilson

[57] ABSTRACT

A hair dryer includes a casing inside which a heat generation device for generation of heat by burning fossil fuel supplied from a removable internal fuel container and a fan for generation of an air flow passing through the heat generation device to be heated thereby for the provision of heated air stream are arranged. The heat generation device includes a cordierite based ceramic body on which a platinum based oxidation catalyst is coated. An initial ignition device is provided to cause an initial burning of the fuel supplied to thereto for heating the catalyst to the working temperature thereof. Once reaching the working temperature, the catalyst itself maintains the oxidation or burning of the fuel in a flameless manner and the heated air flow is continuously supplied until the fuel supply is cut off and the fan turned off.

6 Claims, 4 Drawing Sheets

HAIR DRYER

FIELD OF THE INVENTION

The present invention relates generally to a hair dryer and in particular to a hair dyer wherein heat is generated from chemical energy by burning gas rather than from electrical energy.

BACKGROUND OF THE INVENTION

Hair dryers have been widely used to blow dry wet hair or other wet article. Conventionally, the hair dryer is powered by electrical energy which is converted into heat and which is also used to drive a fan for blowing hot air flow. Since generating hot air flow by converting electrical energy into heat would consume a great quantity of electricity, usually at least 500 W, the conventional hair dryer is designed to be powered by main electricity from, for example, a wall outlet. Such a design has several disadvantages, such as:

(1) Electrical voltage may be different from country to country which prohibits the general consumers to use their own hair dryers in traveling in different countries, unless an adapter or transformer is used.

(2) The conventional hair dryer may not be used at areas where no main electricity is supplied, such as camping in the wilds.

(3) Using the conventional hair dryer in a humid environment (such as in a bathroom) may have the risk of electrical shock.

Thus, it is desirable to provide a hair dryer that is not powered by electrical main so as to overcome such problems encountered in the prior art.

SUMMARY OF THE INVENTION

Therefore, an object of the present invention is to provide a hair dryer which is operated by burning fossil fuel to generate heat so that no electricity from the main is needed in operating the hair dryer.

Another object of the present invention is to provide a hair dryer in which catalytic oxidation reaction is performed on fossil fuel, such as gas, so as to provide a safe, flameless burning of the fuel for generation of heat, the fuel being supplied from, for example, a cigarette lighter so that it may be obtained easily.

A further object of the present invention is to provide a hair dryer which is not powered by electricity from the main so that electrical shock to the hair dryer user may be avoided.

In accordance with the present invention, there is provided a hair dryer comprising a casing inside which a heat generation device for generation of heat by burning fossil fuel supplied from a removable internal fuel container and a fan for generation an air flow passing through the heat generation device to be heated thereby for the provision of heated air stream are arranged. The heat generation device comprises a cordierite-based ceramic body on which a platinum-based oxidation catalyst is coated. An initial ignition device is provided to cause an initial burning of the fuel supplied thereto for heating the catalyst to the working temperature thereof. Once reaching the working temperature, the catalyst itself maintains the oxidation or combustion of the fuel in a flameless manner and the heated airflow is continuously supplied until the fuel supply is cut off and the fan turned off.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
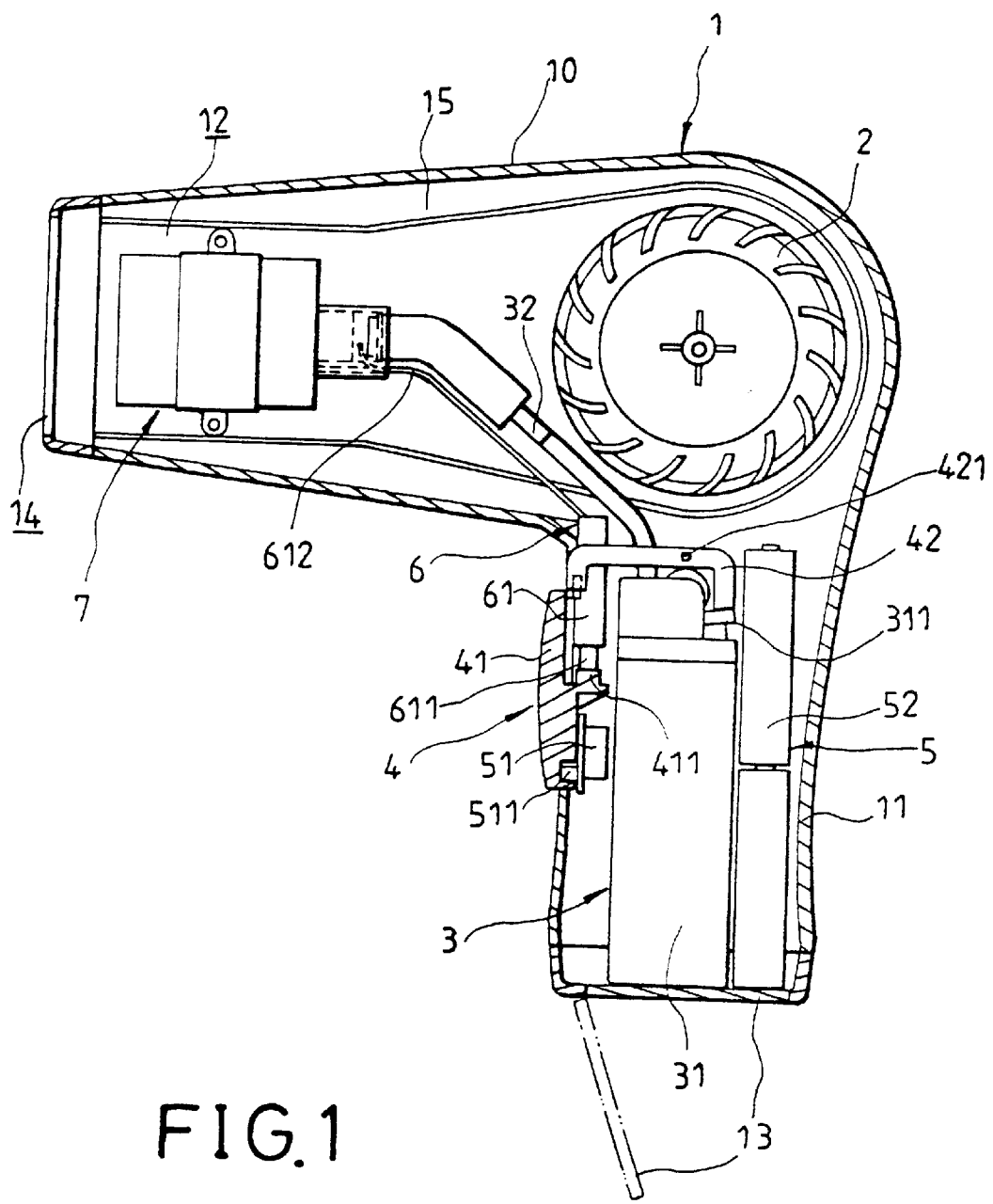
FIG. 1 is a cross-sectional view showing a hair dryer constructed in accordance with the present invention in a de-activated condition.

With reference to the drawings and in particular to FIG. 1 wherein a hair dryer constructed in accordance with the present invention is shown, the hair dryer of the present invention comprises a casing 1 in the form of a pistol having a body portion 10 defining an axis and a handle portion 11 extending from the body portion 10. The body portion 10 of the casing 1 has an axially front open end defining an air outlet 14. A heat generation device 7 is mounted inside the body portion 10 of the casing 1 in the proximity of the air outlet 14. A fan assembly 2 is also mounted inside the body portion 10 of the casing 1 at the axially rear end of the body portion 10. The fan assembly 2 which may have a construction that is known to the art is powered by a power supply assembly 5 comprises an internal power source, such as batteries 52, electrically connected to the fan assembly 2 to cause an air flow from the rear end toward the front end 14 of the body portion 10 of the casing 1 which air flow passes through the heat generation device 7 and then goes out of the casing 1 through the air outlet 14.

Preferably, an inner wall member 15 is provided inside the body portion 10 of the casing 1 which extends from the axially rear end of the body portion 10 of the casing 1 to the axially front end 14 of the casing 1 to define an air tunnel 12 with the heat generation device 7 arranged therein so that the air flow generated by the fan assembly 2 is conducted to substantially completely pass through the heat generation device 7. The provision of the air tunnel 12, however, is optional for the body portion 10 of the casing 1 may be shaped to constitute the tunnel.

Figure 3:
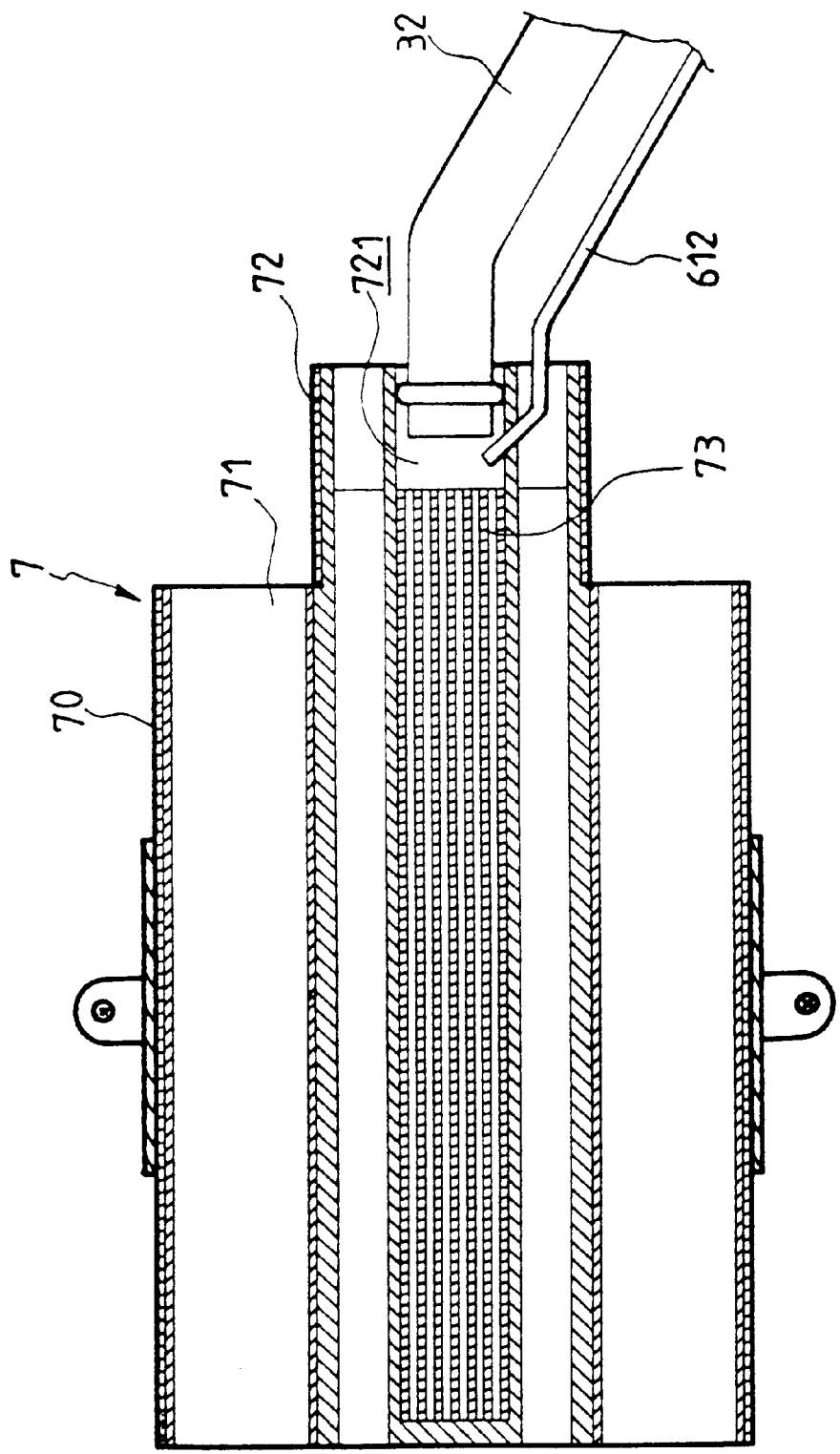
FIG. 3 is an enlarged sectional view of the heat generation device adapted in the hair dryer of the present invention.
Figure 4:
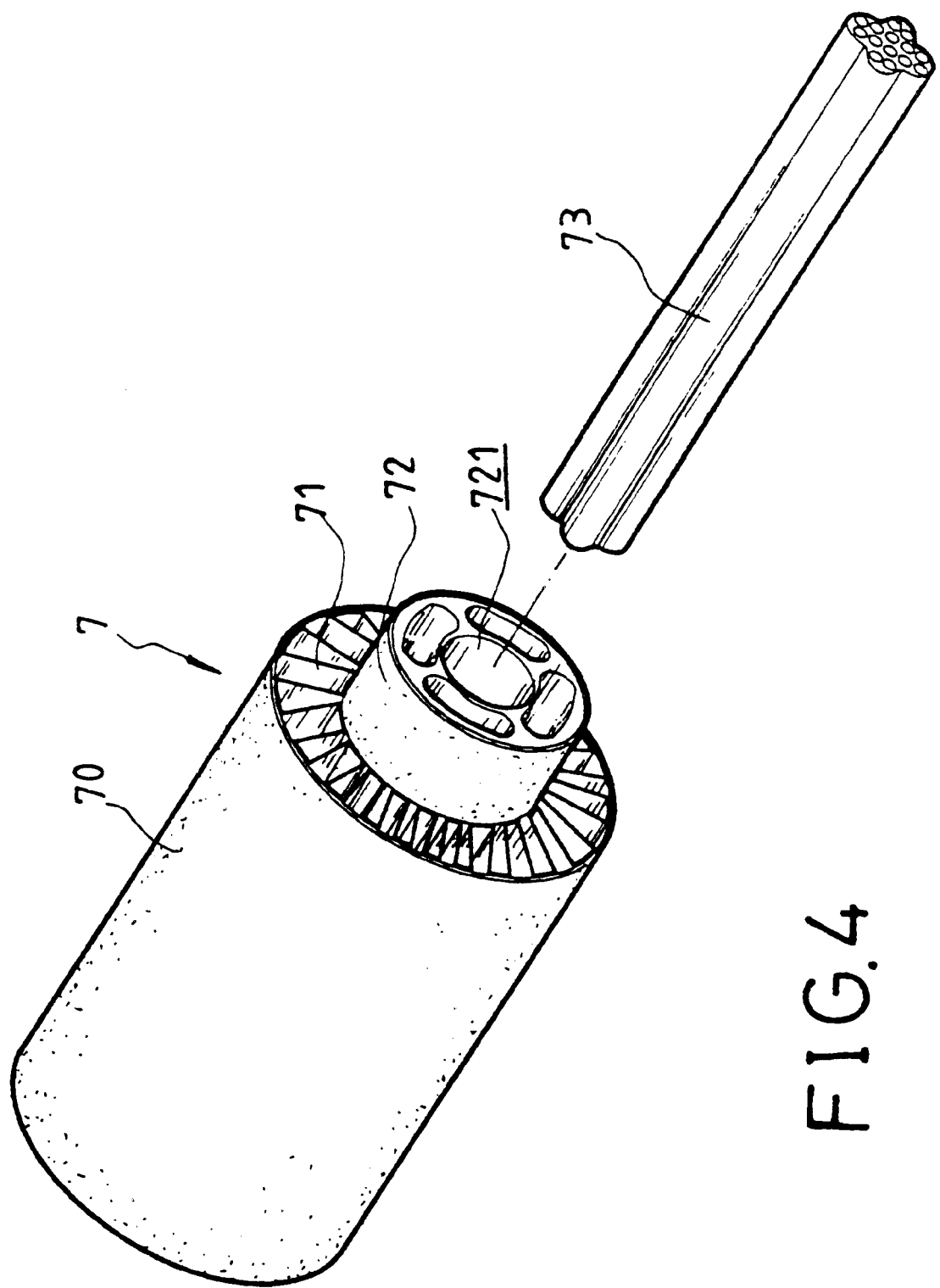
FIG. 4 is an exploded perspective view showing the heat generation device of the hair dryer of the present invention.

In accordance with the present invention, the heat generation device 7 is operated by burning fossil fuel, such as butane, preferably in gaseous form, to generate heat. In a preferred embodiment of the present invention, the heat generation device 7 is catalytic reaction based device. As shown in FIGS. 3 and 4, the heat generation device 7 comprises an outer heater casing 70, preferably a cylindrical member axially extending in the direction of the air flow caused by the fan assembly 2 and defining therein an interior space for receiving a tubular member 72 which is fixed inside the casing 70, preferably in a co-axial manner, by means of radiating fins 71 which radially extend between the inside surface of the heater casing 70 and the outside surface of the tubular member 72. The radiating fins 71 are spaced from each other in a circumferential direction and preferably the radiating fins 71 are equally spaced in the circumferential direction to define therebetween air passages through which the air flow may pass and thus be heated by heat transferred from the radiation fins 71. A central bore 721 is formed, preferably co-axially, in the tubular member 72 into which catalytic oxidation reaction means 73 is inserted and held. The catalytic oxidation reaction means 73, of which the operation is similar to a catalytic converter adapted in a gasoline engine of a vehicle, such as volatile organic compound catalytic device comprising an extruded ceramic body, preferably made of cordierite based material, on which a noble metal coating, such as platinum, serving as catalyst for oxidation reaction of the fossil fuel, such as butane, is formed to activate oxidation or combustion of the fossil fuel when it is at a raised temperature, is made as an elongated member inserted into and securely held in the bore 721 so that when the catalytic oxidation reaction means 73 is at a raised temperature, by applying the fossil fuel thereto, a flameless burning is caused and heat generated. The heat generation by the flameless burning occurring in the catalytic oxidation reaction means 73 is not only transferred to the air flow passing therethrough, but is also used to maintain the chemical reaction occurring thereon.

The tubular member 72 is made of a heat conductive material to facilitate conduction of heat generated by the catalytic oxidation reaction means 73 from the tubular member 72 to the radiating fins 71 and the outer casing 70 from which the heat is transferred to the airflow.

If desired, the body of the catalytic oxidation reaction means 73, which in the embodiment illustrated is made of extruded ceramic material, may be made to have for example honeycomb structure as shown in FIG. 4 to enhance the mechanical property thereof A fuel supply system 3 is provided inside the casing 1, comprising a fuel container 31, such as a cigarette lighter as shown, having fossil fuel, such as butane, contained therein. The fuel container 31 is removably fixed inside the handle portion 11 of the casing 1 by means of a lid 13 which is movably fixed to the handle portion 11 of the casing 1 to openably close an opening (not labeled) through which the fuel container 31 is put into the handle portion 11 of the casing 1. The fuel container 31 has a fuel release button 311 which when actuated allows the fuel contained therein to escape out of the container 31 through a fuel outlet (not shown). A tube 32 defining a fuel passage is provided inside the casing 1, extending from the fuel outlet of the fuel container 31 to the heat generation device 7 for conducting the fuel from the fuel container 31 to the catalytic oxidation reaction means 73 of the heat generation device 7. An ignition device 6 is arranged and securely fixed inside the handle portion 11 of the casing 1, comprising an electronic igniter 61 having a control button 611 which when triggered or actuated causes the electronic igniter 61 to generate spark for ignition of the fuel supplied to the heat generation device 7. Such an electronic igniter 61 has been widely used in for example gas range so that no further detail is needed herein. The ignition device 6 has an electrical wire 612 extending from the igniter 61 and ending at a position between the fuel passage tube 32 and the heat generation device 7 for causing an initial burning or combustion of the fuel supplied from the fuel container 31 to the heat generation device 7 via the tube 32 by means of the spark generated by the igniter 61. The igniter 61 is powered by means of the electricity supplied from the power source built in the hair dryer, namely the batteries 52. A switch assembly 4 is provided on the handle portion 11 of the casing 1 to allow a user to simultaneously start the fan assembly 2, open the fuel container 31 for supplying the fuel from the fuel supply system 3 to the heat generation device 7 and actuate the electronic igniter 61 of the ignition device 6 for causing the fuel supplied to the heat operation device 7 to burn. The initial burning or combustion of the fuel in the heat generation device 7 caused by the spark generated by the igniter 61 heats up the catalytic oxidation reaction means 73 to the working temperature thereof so as to activate the flameless burning of the fuel in the catalytic oxidation reaction means 73.

Figure 2:
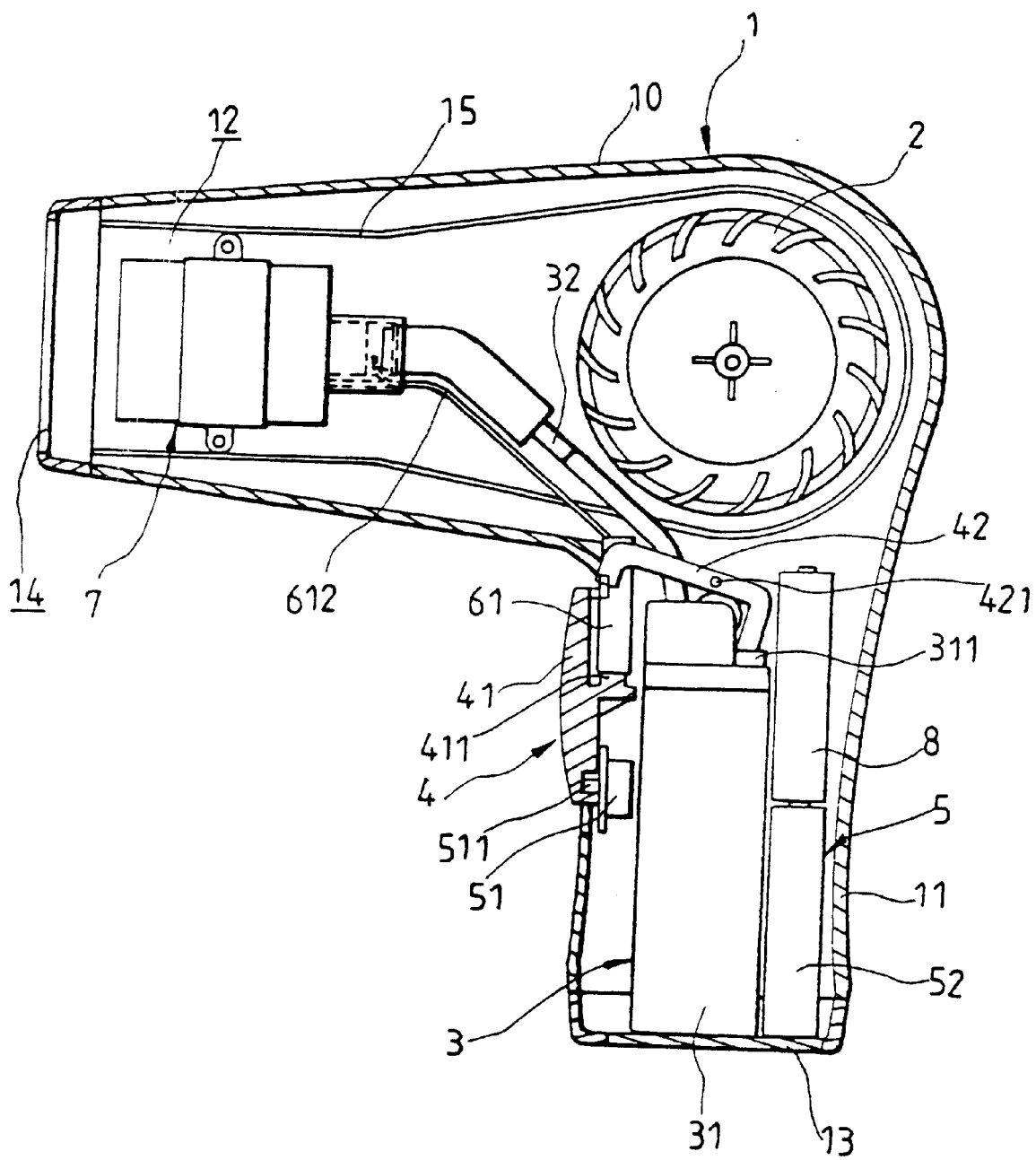
FIG. 2 is a cross-sectional view showing the hair dryer of the present invention in an activated condition.

The switch assembly 4 comprises a slidable member 41 which is slidably mounted on the handle portion 11 of the casing 1 to be movable between an activated position (FIG. 1) and a deactivated position (FIG. 2). The slidable member 41 has an inward projection 411 which is in contact engagement with the control button 611 of the electronic igniter 61 so that when the slidable member 41 is moved from the de-activated position to the activated position, the control button 611 of the igniter 61 is triggered, FIG. 2, to activate the igniter 61 for the generation of spark.

The switch assembly 4 also comprises a rocking arm 42 which is pivoted at 42 inside the handle portion 11 of the casing 1. The rocking arm 42 has a first end in contact engagement with the fuel release button 311 of the fuel container 31 and a second end coupled to the slidable member 41 so that the movement of the slidable member 41 from the de-activated position to the activated position causes the rocking arm 42 to rotate about the pivot 421 in such a direction to actuate the fuel release button 311 by means of the engagement between the fuel release button 311 and the first end of the rocking arm 42, see FIG. 2.

The power supply assembly 5 that comprises the built-in power source (the batteries) 52 also comprises a power ON/OFF switch 51 which is coupled to the slidable member 41 for controlling the supply of the electrical power from the batteries 52 t the fan assembly 2. For example, the power ON/OFF switch 51 may have a projection 511 extending into and engaging a recess formed on the slidable member 41 to provide a coupling therebetween so that the power ON/OFF switch 51 may be movable in unison with the slidable member 41. Thus, the movement of the slidable member 41 causes the power ON/OFF switch 51 of the power supply assembly 5 to move between ON and OFF positions for controlling the supply of the power to the fan assembly 2. By moving the slidable member 41 to the activated position as shown in FIG. 2 to actuate the switching assembly 4, the fuel is released from the fuel container 31 of the fuel supply system 3 to the heat generation device 7. At the same time, the electronic igniter 61 of the ignition device 6 is triggered, causing a spark at the remote end of the wire 612 which in turn ignites the fuel supplied to the heat generation device 7. The fuel thus burns and heats up the catalytic oxidation reaction means 73. The catalyst of the catalytic oxidation reaction means 73 is thus heated to the working temperature thereof, for example 200° C., and initiating the flameless burning. A burning flame is initially and temporarily generated in the heat generation device 7 but may be maintained only for a very short period unit the catalyst is heated to the desired working temperature. As a result, there is no burning flame generated during the operation of the hair dryer except for the very short initial period. Hazard or damage caused by burning flame is thus significantly reduced or even eliminated. The airflow caused by the fan assembly 2 is conducted by the air tunnel 12 to the heat generation device 7 and passes through the heater casing 70 to be heated thereby. Heated air the flows out of the hair dryer through the front outlet 14 of the casing 1.

Although the preferred embodiment has been described to illustrate the present invention, it is apparent that changes and modifications in the specifically described embodiment can be carried out without departing from the scope of the present invention which is intended to be limited only by the appended claims.

What is claimed is:

1. A hair dryer comprising:
   a casing defining therein an interior space and an air tunnel extending from the interior space to an air outlet;

a fan assembly mounted inside the casing to generate an airflow through the air tunnel to reach and get out of the air outlet;

an internal power supply mounted in the interior space of the casing to power the fan assembly through a power ON/OFF switch which is operable between an ON position and an OFF position;

a heat generation device comprising catalytic reaction means for causing catalytic oxidation reaction to generate heat, the heat generation device being arranged in the air tunnel to allow the air flow caused by the fan assembly to pass therethrough for heat transfer from the heat generation device to the air flow and thus heating the air flow and providing a heated air flow blown out of the casing via the air outlet, the catalytic reaction means having metal-based oxidation catalyst which performs the catalytic oxidation reaction at a working temperature;

a fuel supply assembly comprising a fuel container fixed in the interior space of the casing for containing therein a fossil fuel and having a fuel outlet controlled by fuel release means for releasing the fuel out of the fuel container when the fuel release means is actuated, a fuel passage being provided in the casing to conduct the fuel released from the fuel container to the heat generation device to be applied onto the catalytic reaction means for performing catalytic oxidation reaction on the fuel;

a switch assembly for simultaneously moving the power ON/OFF switch to the ON position to power the fan assembly and thus causing the air flow through the air tunnel and actuating the fuel release means to release the fuel from the fuel container to the heat generation device; and catalytic reaction initiating means comprising an ignition device for causing initial burning of the fossil fuel supplied to the heat generation device to heat the oxidation catalyst to the working temperature for starting the catalytic reaction;

wherein the ignition device comprises an electronic igniter which is powered by the internal power supply to generate a spark in the heat generation device which initially ignites the fuel supplied to the heat generation device for the initial burning.

2. The hair dryer as claimed in claim 1, wherein the electronic igniter is triggered by a control button which is coupled to the switch assembly to be controlled thereby so that the switch assembly simultaneously actuates the fan assembly, the fuel supply to the heat generation device and the initial ignition of the fuel supplied to the heat generation device.

3. A hair dryer comprising:

a casing defining therein an interior space and an air tunnel extending from the interior space to an air outlet;

a fan assembly mounted inside the casing to generate an airflow through the air tunnel to reach and get out of the air outlet;

an internal power supply mounted in the interior space of the casing to power the fan assembly through a power ON/OFF switch which is operable between an ON position and an OFF position;

a heat generation device comprising catalytic reaction means for causing catalytic oxidation reaction to generate heat, the heat generation device being arranged in the air tunnel to allow the air flow caused by the fan assembly to pass therethrough for heat transfer from the heat generation device to the air flow and thus heating the air flow and providing a heated air flow blown out of the casing via the air outlet;

a fuel supply assembly comprising a fuel container fixed in the interior space of the casing for containing therein a fossil fuel and having a fuel outlet controlled by fuel release means for releasing the fuel out of the fuel container when the fuel release means is actuated, a fuel passage being provided in the casing to conduct the fuel released from the fuel container to the heat generation device to be applied onto the catalytic reaction means for performing catalytic oxidation reaction on the fuel; and a switch assembly for simultaneously moving the power ON/OFF switch to the ON position to power the fan assembly and thus causing the air flow through the air tunnel and actuating the fuel release means to release the fuel from the fuel container to the heat generation device;

wherein the heat generation device comprises a heat conductive tubular member having a bore into which the catalytic reaction means is received and securely held, the tubular member having a plurality of radiating fins extending therefrom for facilitating heat transfer between the tubular member of the heat generation device and the air flow.

4. The hair dryer as claimed in claim 3, wherein the heat generation device further comprises an outer casing within which the tubular member is received, the fins being arranged to extend between the outer casing and the tubular member and spaced from each other to allow the air flow to pass therethrough.

5. A hair dryer comprising:

a casing defining therein an interior space and an air tunnel extending from the interior space to an air outlet;

a fan assembly mounted inside the casing to generate an airflow through the air tunnel to reach and get out of the air outlet;

an internal power supply mounted in the interior space of the casing to power the fan assembly through a power ON/OFF switch which is operable between an ON position and an OFF position;

a heat generation device comprising catalytic reaction means for causing catalytic oxidation reaction to generate heat, the heat generation device being arranged in the air tunnel to allow the air flow caused by the fan assembly to pass therethrough for heat transfer from the heat generation device to the air flow and thus heating the air flow and providing a heated air flow blown out of the casing via the air outlet;

a fuel supply assembly comprising a fuel container fixed in the interior space of the casing for containing therein a fossil fuel and having a fuel outlet controlled by fuel release means for releasing the fuel out of the fuel container when the fuel release means is actuated, a fuel passage being provided in the casing to conduct the fuel released from the fuel container to the heat generation device to be applied onto the catalytic reaction means for performing catalytic oxidation reaction on the fuel; and a switch assembly for simultaneously moving the power ON/OFF switch to the ON position to power the fan assembly and thus causing the air flow through the air tunnel and actuating the fuel release means to release the fuel from the fuel container to the heat generation device, the switch assembly comprising a slidable member slidably mounted on the casing to be movable between an activated position and a deactivated position;

wherein the fuel release means of the fuel container comprises a button movable to open the fuel outlet and wherein the switch assembly comprises a rocking arm pivoted inside the casing and having a first end coupled to the button of the fuel container and a second end coupled to the slidable member so that when the slidable member is moved from the de-activated position to the activated position, the rocking arm is rotated about the pivot to move the button for opening the fuel outlet.

6. The hair dryer as claimed in claim 5, wherein the power ON/OFF switch comprises a projection which is received in and engaging with a recess formed on the slidable member so as to have the power ON/OFF switch movable in unison with the slidable member.

* * * * *